Nov. 5, 1940.   D. F. SPROUL   2,220,128

FRICTION BOLSTER SPRING

Filed March 18, 1939   2 Sheets-Sheet 1

Inventor:
Donald F. Sproul
By Mann, Brown & Co.
Attys

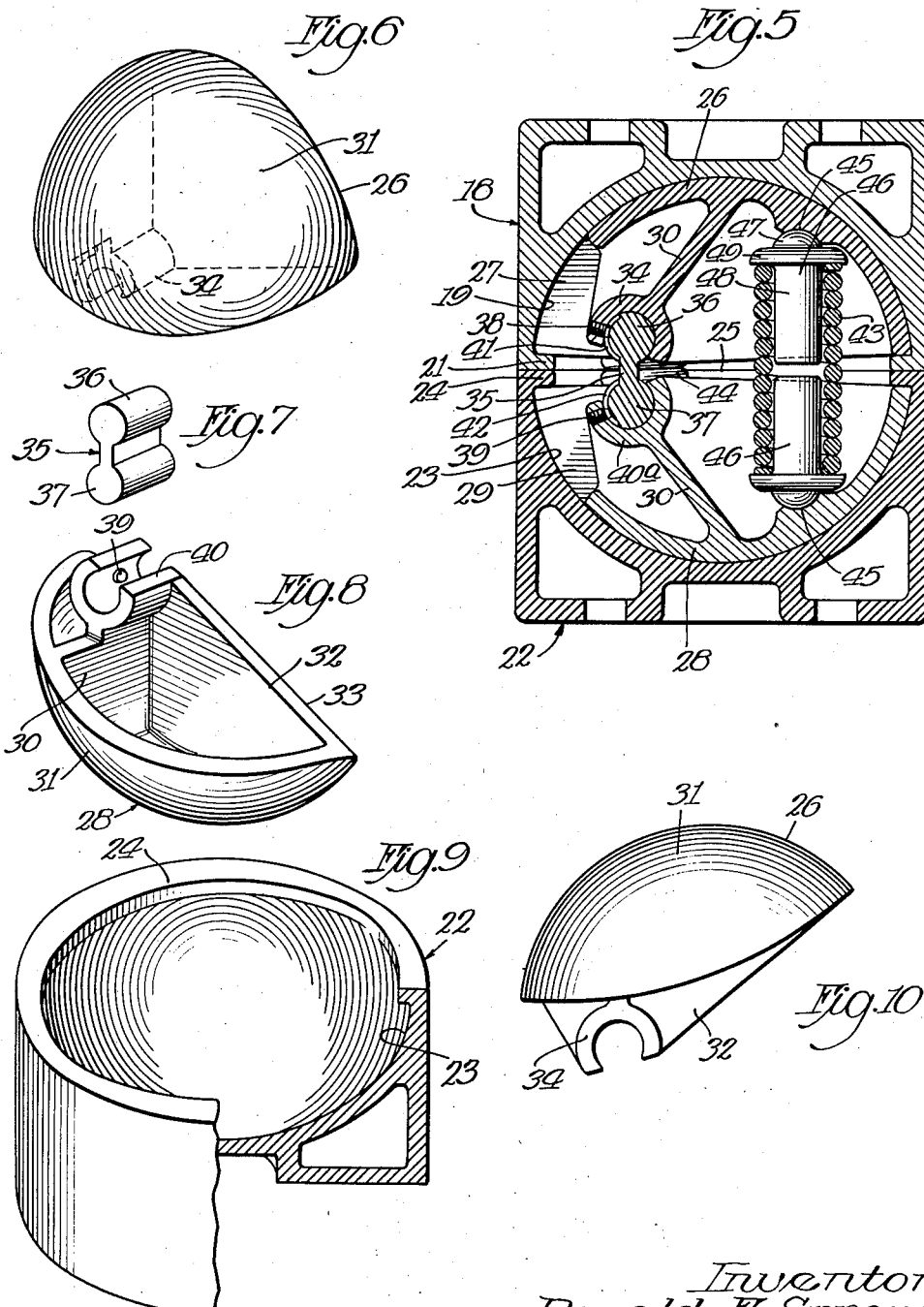

Patented Nov. 5, 1940

2,220,128

UNITED STATES PATENT OFFICE 2,220,128

FRICTION BOLSTER SPRING

Donald F. Sproul, Chicago, Ill., assignor to Cardwell-Westinghouse Company, a corporation of Delaware Application March 18, 1939, Serial No. 262,654

14 Claims. (Cl. 267—9)

This invention relates to friction units for use in bolster supporting spring assemblies for railway cars.

One of the objects of the invention is the provision of a new and improved friction unit for spring assemblies that is provided with novel means for increasing frictional resistance to the compression of the assembly as the same is compressed.

Another object of the invention is the provision of a new and improved friction unit having load supporting springs associated therewith.

A further object of the invention is the provision of a new and improved friction unit having hinged sections reacted on by load supporting springs for resisting the relative movement of the sections during the compression of the unit.

A still further object of the invention is the provision of a new and improved friction unit that may be manufactured at reasonable expense, is easily assembled, efficient in operation and that may be substituted for one of the spring units of the conventional bolster supporting helical spring assembly.

Other and further objects and advantages of the invention will appear from the following description taken in connection with the accompanying drawings in which—

Fig. 5 is a view similar to Fig. 3 but showing the unit in compressed position;

Fig. 6 is a perspective view of one of the friction elements;

Fig. 7 is a perspective view of one of the connecting links between a pair of friction elements;

Fig. 8 is a perspective view of one of the friction elements taken from a different position from that shown in Fig. 6;

Fig. 9 is a perspective view of one of the followers, with parts in section; and Fig. 10 is a side elevation of one of the friction units.

Figure 1:
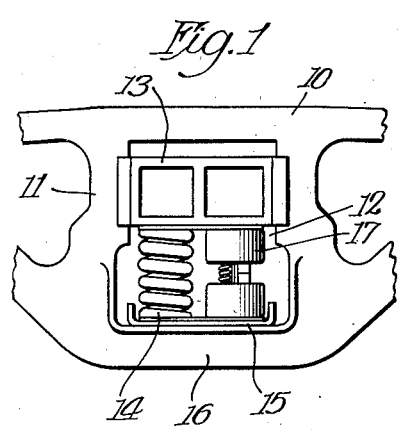
Fig. 1 is a side elevation of a vehicle truck showing the invention in position therein, with parts broken away.
Figure 2:
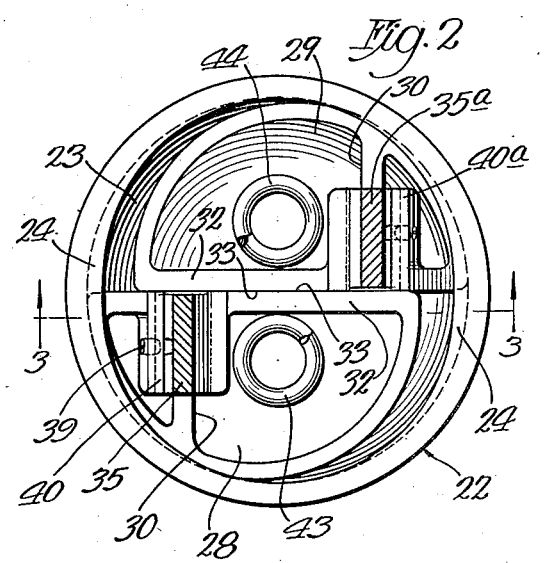
Fig. 2 is a horizontal section of the unit on the line 2—2 of Fig. 3.

In the construction of freight car trucks, it is common practice to support the bolster from the truck frame by means of an assembly of helical springs beneath each end of the bolster. But since helical springs are freely acting, it has been proposed to provide means for preventing harmonic vibration of the spring assembly. This harmonic vibration may be prevented by introducing friction mechanism for resisting either the compression or expansion of the assembly. The present invention has for its principal object the introduction of friction means into the bolster supporting spring assembly that is adapted to function as a load supporting member and as a means for creating friction for resisting the compression of the unit with an increasing frictional resistance as the compression increases.

Referring now to the drawings, the reference character 10 designates a railway truck having the side frame 11 provided with a bolster opening 12 into which an end of a bolster 13 extends. The bolster is supported by a spring assembly 14 which rests on a spring plank 15 supported by the lower chord 16 of the side frame 11, as is usual in such constructions. Since the details of the truck constitute no part of the present invention, it is not thought necessary to further illustrate or describe the same further than to say that the friction spring-unit 17 has been substituted for one of the conventional helical springs 14 at each end of the bolster.

Figure 4:
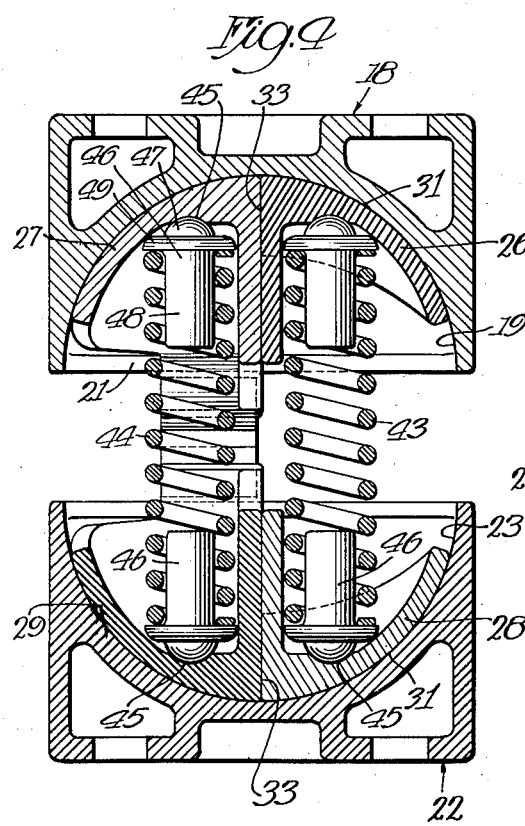
Fig. 4 is a vertical section of the unit taken at right angles to that shown in Fig. 3 on the line 4—4 of Fig. 3.

The friction spring-unit 17 is of substantially the same length and diameter as the conventional bolster supporting helical spring and may be substituted for any one of the helicals of the spring assembly. Each of these units comprises a cap member or upper follower 18 provided on its underside with a recess 19 which is in the form of a segment of a sphere but slightly less than a hemisphere and for convenience of description may be referred to as a segmental spherical recess. The follower is provided with an inwardly extending segmental flange 21 on its lower portion which limits the turning movement of the friction elements, as will presently appear. This flange fades out at opposite sides of the recess 19 in a plane at right angles to the plane of movement of the friction elements, as shown in Fig. 4. The elimination of portions of this flange is for the purpose of facilitating the assembly of the device.

A base member or lower follower 22 is positioned vertically beneath the upper follower 18 and is a duplicate of the upper follower. It is provided with a substantially spherical recess 23 and an inwardly extending segmental flange 24 corresponding to the recess 19 and flanges 21 of the upper follower.

The recess 19 and the recess 23 are preferably, though not necessarily, substantially hemispherical in that when the flange 21 rests on the flange 24, the recesses 19 and 23 constitute a spherical recess. The inner surfaces of the recesses 19 and 23 constitute friction surfaces and when the flange 21 rests on the flange 24, the two friction surfaces are concentric, that is, they have a common center as at 25 in Fig. 5. It is to be understood that each of these recesses may be a segment of a sphere less than a hemisphere.

Suitable means are provided for frictionally engaging these segmental spherical surfaces and for resiliently resisting the movement of the followers toward each other. In the form of the device selected to illustrate one embodiment of the invention, two friction elements are provided for each recess. These elements are arranged in pairs, one member of each pair being in the upper recess and the other in the lower. The members of each pair are movable relative to each other during the operation of the device. As shown, the recess 19 is provided with the friction elements 26 and 27 and the recess 23 is provided with the friction elements 28 and 29. These friction elements are hollow and the friction elements in each recess, when taken together, form a segment of a sphere which is materially less than a hemisphere. For the purpose of description, however, each friction element may be regarded as a quadrant of a sphere and since they are substantially duplicates of each other, except that the members of each pair are reversed, only one need be described.

Each quadrant is provided with a curved outer wall 31, Fig. 6, and a flat or straight vertical inner wall 32, Fig. 8, having a flat friction surface 33 which is adapted to engage a corresponding friction surface on the adjacent quadrant, as shown more clearly in Fig. 4 of the drawings. Each of the quadrants or friction elements is provided with a bearing 34, Fig. 8, the axis of which extends transversely to the flat wall 32 and is slightly greater than a semi-circle. This bearing is supported by the wall 32 and a transverse web 30. It is located adjacent to one end of the wall 32 or supporting quadrant. A link 35 having the journals 36 and 37 thereon, which are adapted to engage the bearings 34 and 40 of the quadrants 26 and 28, respectively, and a similar link having journals 36a and 37a engages corresponding bearings 34a and 40a on the quadrants 27 and 29, respectively, Fig. 3. In other words, the link 35 connects the pair of quadrants 26 and 28 and a similar link 35a connects the quadrants 27 and 29. The journals 36 and 37 are adapted to be held in the bearings 34 and 40 by any suitable means such as the set screws 38 and 39 which engage in suitable grooves 41 and 42, Fig. 5, arranged in the same plane in the journals 36 and 37, respectively. These set screws engaging in the grooves beyond the equatorial plane of the journals not only prevent withdrawal of the journals from their bearings but limit the rotation of those journals to the plane of the grooves. The link 35a is connected in a similar manner.

Figure 3:
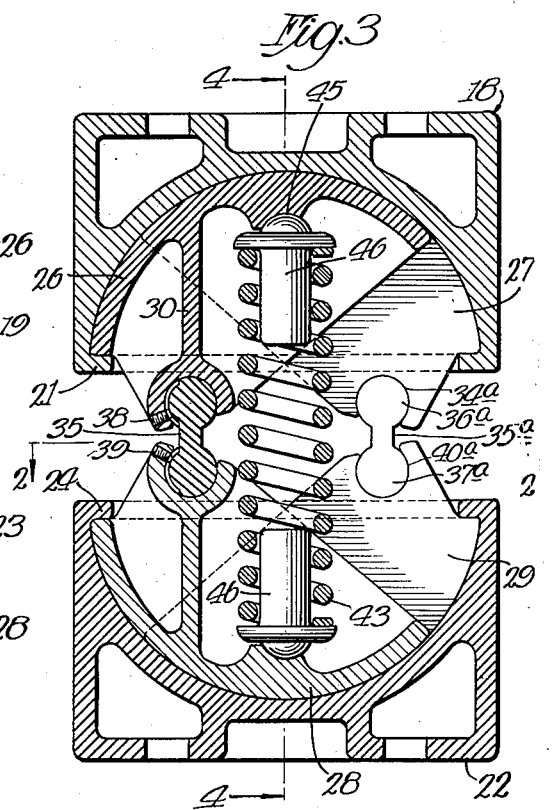
Fig. 3 is a vertical section of the unit on the line 3—3 of Fig. 2.

Suitable resilient means are provided for resisting the compression of the unit and for returning the parts to normal position after release. As shown, the springs 43 and 44 are employed for this purpose. The spring 43 is between the pair of quadrants 26 and 28 and the spring 44 is between the pair of quadrants 27 and 29, Fig. 4. In order that these springs shall be held in operative position within the hollow quadrants, each of the quadrants is provided with a curved recess 45, Fig. 4, and the spring has a positioning member 46 in each end thereof having a dome-shaped head 47 that engages in the corresponding recess 45. The positioning member 46 is provided with a stem 48, Fig. 4, that extends within the spring and a flange 49 against which the spring is adapted to seat. The recesses 45 are preferably, though not necessarily, substantially in the diameter of the opposed pair of friction members, as indicated in Fig. 3, and are parallel to the links 35 and webs 30 when the unit is extended, as shown more clearly in Fig. 3 of the drawings. By means of this arrangement, the friction between the quadrants and engaging walls of the spherical recess is at a minimum because if we regard the links 35 and 35a as fulcrums and the springs as the power, the leverage that is the distance the power is from the fulcrum (the springs from the links) increases as the springs are compressed, hence there is greater pressure of the quadrants on the friction surfaces of the recesses as the unit is compressed.

In the operation of the device, when the unit is compressed, the movement is resisted by the springs but as the springs yield, the segments of each pair are caused to rotate in opposite directions. The spring forces the segments out into frictional contact with the interior of the recesses or sockets and also forces the segments in each recess into frictional contact with each other since the curved surfaces of the socket act as wedge surfaces for forcing the segments of each recess inwardly toward each other.

The parts are constructed so that the segments in each socket rotate in opposite directions thereby frictionally resisting the compression of the unit. It will be seen from a comparison of Figs. 3 and 5 that as the springs 43 and 44 are compressed, each pair of quadrants is caused to rotate toward each other and since they rotate about the journals 36 and 37 which are eccentric to the curved inner surface of the recesses or sockets in the followers, the springs, which will remain perpendicular to the plane of the flanges 21 and 24, will move outwardly from the center 25, see Fig. 5, thus increasing the leverage which will cause increasing friction between the contacting surfaces of the segment and walls of the socket as the unit is compressed. Upon release, the springs will move the quadrants to their normal position, as illustrated in Figs. 3 and 4.

It is thought from the foregoing, taken in connection with the accompanying drawings, that the construction and operation of my device will be apparent to those skilled in the art and that changes in size, shape, proportion and details of construction may be made without departing from the spirit and scope of the appended claims.

I claim as my invention:

1. A spring-unit for use in a bolster supporting spring assembly comprising a cap member, a base member, said members having opposed hemispherical recesses, a two-part hemispherical friction member engaging each recess, means connecting corresponding portions of said friction members, said means comprising a link member hingedly connected at its ends to the two parts of said friction member, and spring means for holding the hinged members in extended position.

2. In a spring-unit, an upper follower, a bottom follower, said followers having opposed sockets curved in cross-section, a pair of opposed quadrant friction elements engaging said sockets, a second pair of opposed quadrant friction elements engaging said sockets and lapping past the first-named pair and frictionally engaging the same, means pivotally connecting the members of each pair together, and spring means for resisting the turning of pairs of friction elements in said sockets.

3. In a friction spring-unit, an upper follower, a lower follower, friction mechanism between said followers, said mechanism comprising a plurality of pairs of segmental spheres, one of each pair engaging in a segmental spherical recess in one of said followers and the other segmental spheres of the other pair engaging in a segmental recess in the other follower, and means for movably connecting the members of each pair together.

4. In a friction spring-unit, a bottom follower, a top follower, mechanism including compression springs between said followers for frictionally resisting the compression of said unit, said mechanism comprising members rotatable about axes extending transversely to the longitudinal axis of the spring-unit having a frictional contact with said followers, and with each other.

5. In a friction spring-unit, a bottom follower, a top follower, mechanism including compression springs between said followers for frictionally resisting the compression of said unit, said mechanism comprising friction members arranged in pairs pivotally connected together and rotatable in opposite directions when said unit is compressed, said pairs frictionally engaging each other and frictionally engaging the followers.

6. A friction spring-unit comprising top and bottom followers, said followers having semi-spherical sockets facing each other, sectional hemispherical friction elements engaging in said sockets, arms on said elements extending diagonally outwardly, said elements being connected in two pairs, one of each pair being above the other member of the pair, a link for connecting the members of each pair together, and a spring between the members of each pair for yieldingly resisting the elements of each pair from approaching each other when the unit is compressed.

7. A friction spring-unit comprising a top follower, a bottom follower, said followers having opposed sockets having friction surfaces curved in cross-section, a pair of segmental spherical friction elements in each socket and rotatable in opposite directions when the unit is compressed, means for movably connecting one of each pair of friction elements together, means for connecting the other of each pair of friction elements together, said means causing rotation of said elements upon compression of said unit, and springs between the elements connected together for yieldingly resisting the rotation of said elements when the unit is compressed.

8. A friction spring-unit comprising upper and lower followers, friction elements arranged in pairs pivotally connected together and rotatably engaging said followers and one another, and resilient means for yieldingly resisting the compression of said unit and for forcing said elements into frictional engagement with said followers and with one another.

9. In a friction spring-unit, a pair of opposed followers, two pairs of friction elements frictionally engaging said followers, means for connecting the elements of one pair together, means for connecting the elements of the other pair together, said means causing the members of each pair of elements to turn in opposite directions when said unit is compressed, means for yieldingly resisting the relative turning movements of said elements, and means on said followers for causing increasing frictional resistance between the adjacent elements of the two pairs upon increasing the compression of said followers.

10. In a friction spring-unit, a pair of followers, two friction elements for each follower, pivot means for eccentrically connecting the two elements for one follower to the corresponding elements of the other follower for forming two sets of friction elements, a spring between each set, and means for forcing the elements of each pair into frictional contact with one another when said unit is compressed.

11. In a friction spring-unit, an upper and a lower follower having opposed hemispherical recesses therein, two spherical segments in each recess, the segments at one side of a vertical plane through said recesses constituting a pair of segments, the segments of each recess having contacting faces in a vertical plane, each segment having an inwardly and laterally extending arm, links for pivotally connecting the arms of each pair of segments together, a spring between each pair of segments, said springs being normally substantially vertical and adjacent to the vertical diameter of said recesses, whereby friction between said segments will be increased as the unit is compressed.

12. In a friction spring-unit, an upper and a lower follower having opposed hemispherical recesses therein, two spherical segments in each recess, the segments at one side of a vertical plane through said recesses constituting a pair of segments, the segments of each recess having contacting faces in a vertical plane, each segment having an inwardly and laterally extending arm, links for pivotally connecting the arms of each pair of segments together, a spring between each pair of segments, said springs being normally substantially vertical and adjacent to the vertical diameter of said recesses, and cooperating means on said segments and followers for limiting the separation of said followers.

13. A spring-unit for use in a bolster supporting spring assembly comprising a cap member, a base member, said members having opposed hemispherical recesses, a two-part hemispherical friction member engaging each recess, hinge means connecting corresponding portions of said friction members, spring means for holding the hinged members in extended position, and a segmental flange extending about each recess for engaging said friction members for limiting the compression of said unit.

14. In a friction spring-unit, a bottom follower, a top follower, mechanism including compression springs between said followers for frictionally resisting the compression of said unit, said mechanism comprising rotatable members having a frictional contact with said followers, and with each other, cooperating means on said followers and members for forcing said members into frictional contact when said spring unit is compressed, and cooperating means on said followers and members for limiting the rotation of said members.

DONALD F. SPROUL.